US011573863B2

(12) United States Patent
Mayer et al.

(10) Patent No.: US 11,573,863 B2
(45) Date of Patent: Feb. 7, 2023

(54) VIRTUAL MACHINE BACKUP AND RESTORE COORDINATOR

(71) Applicant: KYNDRYL, INC., New York, NY (US)

(72) Inventors: Stefan Mayer, Gundelfingen (DE); Moncef Benboubakeur, Brno (CZ); Erik Rueger, Ockenheim (DE)

(73) Assignee: Kyndryl, Inc., New York, NY (US)

( * ) Notice: Subject to any disclaimer, the term of this patent is extended or adjusted under 35 U.S.C. 154(b) by 101 days.

(21) Appl. No.: 16/377,450

(22) Filed: Apr. 8, 2019

(65) Prior Publication Data
US 2020/0319799 A1  Oct. 8, 2020

(51) Int. Cl.
G06F 11/14 (2006.01)
G06F 3/06 (2006.01)
G06F 16/23 (2019.01)
G06F 9/455 (2018.01)
G06F 16/27 (2019.01)

(52) U.S. Cl.
CPC ......... G06F 11/1458 (2013.01); G06F 3/065 (2013.01); G06F 3/067 (2013.01); G06F 3/0619 (2013.01); G06F 3/0664 (2013.01); G06F 9/45558 (2013.01); G06F 11/1461 (2013.01); G06F 11/1469 (2013.01); G06F 16/2379 (2019.01); G06F 16/27 (2019.01); G06F 2009/45583 (2013.01)

(58) Field of Classification Search
CPC .. G06F 11/1458; G06F 16/27; G06F 11/1461; G06F 11/1469; G06F 3/065; G06F 3/0619; G06F 3/0664; G06F 16/2379; G06F 9/45558; G06F 3/067; G06F 2009/45583
See application file for complete search history.

(56) References Cited

U.S. PATENT DOCUMENTS

| 8,060,476 B1 | 11/2011 | Afonso et al. |
| 8,135,930 B1 | 3/2012 | Mattox et al. |
| 8,442,945 B1 | 5/2013 | Doerner |
| 8,924,352 B1 * | 12/2014 | Andruss ............. G06F 11/1461 |
| | | 707/640 |
| 8,959,509 B1 | 2/2015 | Sobel et al. |
| 9,563,514 B2 | 2/2017 | Dornemann |

(Continued)

OTHER PUBLICATIONS

Mell et al., "The NIST Definition of Cloud Computing", Recommendations of the National Institute of Standards and Technology, Sep. 2011, 7 pages.

*Primary Examiner* — Mariela Reyes
*Assistant Examiner* — Fernando M Mari Valcarcel
(74) *Attorney, Agent, or Firm* — John Kennel; George S. Blasiak; Heslin Rothenberg Mesiti Farley PC

(57) ABSTRACT

A backup and restore coordinator configured to receive a plurality of backup and restore requests from at least two uncoordinated backup functionalities implemented in a virtual environment, the virtual environment including a hypervisor hosting a plurality of virtual machines and a backup server. The backup and restore coordinator configured to extract respective information from the plurality of backup and restore requests including target data, backup resource information, and a type of request. The backup and restore coordinator configured to order the plurality of backup and restore requests in a prioritized queue based on the information extracted from the plurality of backup and restore requests.

20 Claims, 8 Drawing Sheets

(56) References Cited

U.S. PATENT DOCUMENTS

| | | | |
|---|---|---|---|
| 9,772,909 B1* | 9/2017 | Xing | G06F 11/1451 |
| 10,025,673 B1* | 7/2018 | Maccanti | G06F 11/1451 |
| 10,067,692 B2 | 9/2018 | Liu et al. | |
| 2005/0149577 A1* | 7/2005 | Okada | G06F 11/1458 |
| 2006/0047895 A1* | 3/2006 | Rowan | G06F 11/1474 |
| | | | 711/112 |
| 2010/0332453 A1* | 12/2010 | Prahlad | G06F 11/1448 |
| | | | 707/E17.007 |
| 2012/0084262 A1* | 4/2012 | Dwarampudi | G06F 3/0619 |
| | | | 707/667 |
| 2012/0310889 A1 | 12/2012 | McNeil et al. | |
| 2013/0066839 A1* | 3/2013 | Westwood | G06F 11/1469 |
| | | | 707/679 |
| 2014/0196056 A1* | 7/2014 | Kottomtharayil | G06F 9/5083 |
| | | | 718/105 |
| 2014/0310246 A1* | 10/2014 | Vijayan | G06F 11/1464 |
| | | | 707/679 |
| 2016/0283274 A1* | 9/2016 | Kochunni | G06F 9/5022 |
| 2018/0060184 A1* | 3/2018 | Thakkar | G06F 11/1448 |
| 2018/0285200 A1* | 10/2018 | Inbaraj | G06F 11/1458 |
| 2018/0285202 A1* | 10/2018 | Bhagi | G06F 16/27 |
| 2018/0322019 A1* | 11/2018 | Stowell | G06F 9/4843 |

\* cited by examiner

VIRTUAL MACHINE BACKUP AND RESTORE COORDINATOR

BACKGROUND

The present disclosure relates to virtual machines, and, more specifically, to data backups and/or restores in virtual environments.

Virtualization collects a shared pool of distributed resources and dynamically supplies portions of the shared pool of distributed resources to multiple clients on an as-needed basis. Historically, computational inefficiencies occur when a single entity acquires physical computational resources necessary to meet its maximum computational load. Since most entities have cyclical computing needs (e.g., predictable fluctuations throughout the day, month, quarter, year, etc.) that also change over time (e.g., an increasing percentage of business processes are being digitized over time), procuring physical computational resources necessary to meet the entity's maximum computational requirements causes inefficiencies during the off-cycle (e.g., excess capacity when less than the maximum computational load is required), and the physical computational resources become outdated relatively quickly. In light of this challenge, virtualization provides efficiency gains by supplying virtualized resources to entities on an as-needed basis.

With the increasing amount of virtualized computing, there is also an increasing need to backup and/or restore virtual machines (VMs) on a regular, intermittent, or as-needed basis in order to provide redundancy in the event of service interruptions, power outages, hardware malfunctions, inadvertent deletions, and so on. Several backup techniques for VMs are currently in existence.

A first backup technique is initiated by a backup server. A backup server scheduler incorporated into the backup server collects statistical information about the server environment and triggers a VM to initiate a backup when the backup server is below a predefined level of utilization. Disadvantageously, this first technique schedules backups exclusively based on the resource utilization of the backup server and disregards the resource utilization of the various VMs.

A second backup technique is initiated by an in-guest backup client associated with a virtual machine. According to the second technique, the in-guest backup client initiates backups according to a manual schedule. Disadvantageously, this second technique is unaware of resource utilization at the backup server and is also unaware of backup processes being executed by other VMs in the virtual environment. Both of these factors contribute to a high likelihood of conflicts when multiple VMs attempt to perform backup operations at the same time and overload the backup server.

A third technique is initiated by a proxy backup client that interfaces directly with the hypervisor and triggers backup operations of the virtualized environment according to a manually developed schedule. Disadvantageously, this third technique performs inflexible backup operations according to a manual schedule.

Thus, two technical challenges associated with performing backups in virtual environments are: 1) configuring backups at times beneficial to (or at least not detrimental to) both the VM and the backup server, and 2) reducing conflicts, collisions, and duplications realized when multiple types of backup solutions are implemented in the same virtual environment.

SUMMARY

Aspects of the present disclosure are directed toward a computer-implemented method comprising receiving, at a backup and restore coordinator, a plurality of backup and restore requests from at least two uncoordinated backup functionalities implemented in a virtual environment, the virtual environment including a hypervisor hosting a plurality of virtual machines and a backup server. The method further comprising extracting, by the backup and restore coordinator and from respective requests of the plurality of backup and restore requests, respective information including target data, backup resource information, and a type of request. The method further comprising ordering the plurality of backup and restore requests in a prioritized queue of the backup and restore coordinator based on the information extracted from the plurality of backup and restore requests.

Advantageously, the method discussed above reduces conflicts between two or more uncoordinated backup functionalities implemented in a virtual environment by ordering backup and restore requests received from the uncoordinated backup functionalities in the prioritized queue.

Other aspects of the present disclosure consistent with the method described above further include a first request of the plurality of backup and restore requests being prioritized over a second request in response to determining that the first request is a restore request and that the second request is a backup request.

Advantageously, this embodiment of the present disclosure prioritizes restore requests over backup requests, even when a backup request and restore request are generated by different uncoordinated backup functionalities. Prioritizing restore requests over backup requests can improve functionality by completing a time-sensitive restore request as soon as possible and deferring a less time-sensitive backup request.

Other aspects of the present disclosure consistent with the method described above further include at least a portion of the plurality of backup and restore requests being received at the backup and restore coordinator from a monitoring client implemented by the backup and restore coordinator, where the monitoring client is associated with a backup client of a virtual machine of the plurality of virtual machines.

Advantageously, these embodiments utilize a monitoring client to monitor backup clients associated with individual virtual machines hosted by a hypervisor. Monitoring individual backup clients enables the backup and restore coordinator to identify and record backup operations that are not initiated by the hypervisor or the backup server.

Other aspects of the present disclosure consistent with the method described above further include removing duplicate requests, where duplicate requests include at least two backup requests received from different uncoordinated backup functionalities and attempting to back up a same set of data, or at least two restore requests received from different uncoordinated backup functionalities and attempting to restore a same set of data.

Advantageously, removing duplicate requests initiated by different uncoordinated backup functionalities improves efficiency by reducing the number of times different data is backed up or restored in the virtual environment.

Further aspects of the present disclosure are directed to a system comprising a hypervisor, a plurality of virtual machines (VMs) hosted by the hypervisor, a backup server communicatively coupled to the hypervisor, at least two uncoordinated backup functionalities configured to provide redundancy to the plurality of virtual machines using the backup server, and a backup and restore coordinator communicatively coupled to the hypervisor. The backup and restore coordinator comprises a prioritized queue that orders a plurality of backup and restore requests received from the at least two uncoordinated backup functionalities.

Advantageously, the system discussed above reduces conflicts between two or more uncoordinated backup functionalities implemented in a virtual environment by ordering backup and restore requests received from the uncoordinated backup functionalities in the prioritized queue.

Further aspects of the present disclosure are directed toward a backup and restore coordinator comprising a communication interface for communicating with a hypervisor and a plurality of monitoring clients respectively coupled to a plurality of virtual machines hosted by the hypervisor in a virtual environment. The backup and restore coordinator further comprises a profiles database storing backup preferences of the plurality of virtual machines. The backup and restore coordinator further comprises a settings database storing administrative settings regarding types of backups for respective virtual machines, auto-registration settings for respective virtual machines, and a prioritization scheme. The backup and restore coordinator further comprises a backup and restore database storing historical and ongoing requests for backups and restores received from at least two uncoordinated backup functionalities implemented in the virtual environment. The backup and restore coordinator further comprises a prioritized queue of backups and restores for the plurality of virtual machines, where the prioritized queue orders a plurality of backup and restore requests based on information in the profiles database, settings database, and backup and restore database. The backup and restore coordinator being configured to implement backups and restores in the virtual environment according to the prioritized queue.

Advantageously, the backup and restore coordinator discussed above reduces conflicts between two or more uncoordinated backup functionalities implemented in a virtual environment by ordering backup and restore requests received from the uncoordinated backup functionalities in the prioritized queue.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
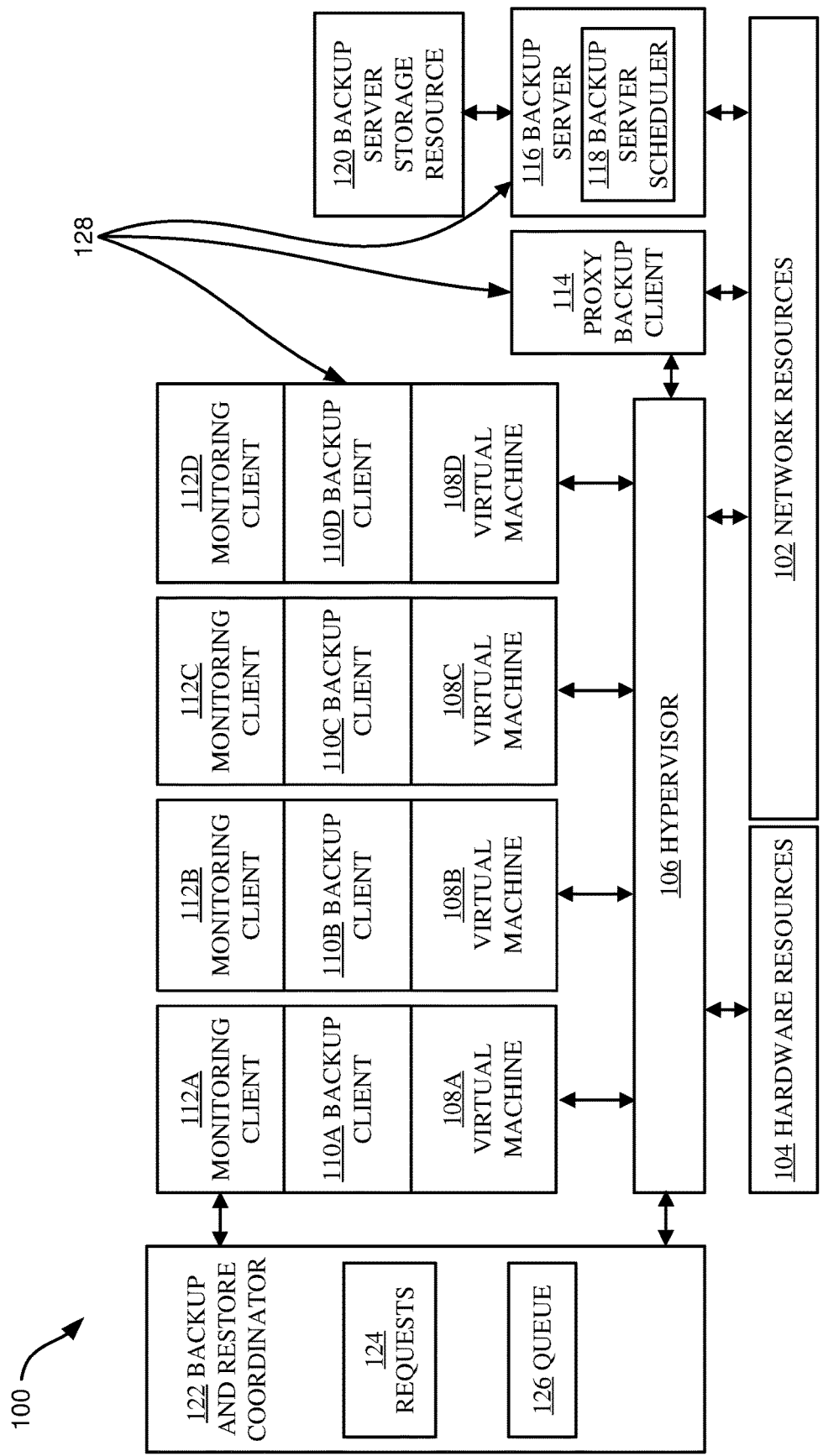
FIG. 1 illustrates a block diagram of an example virtual environment, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward virtual machines, and, more specifically, to coordinating backups and/or restores amongst multiple backup systems in a virtual environment. While not limited to such applications, embodiments of the present disclosure may be better understood in light of the aforementioned context.

Backup and/or restore functionality can be provided by multiple components of a virtual environment. For example, backup and/or restore functionality can be provided as a component of a virtual machine (e.g., a backup client), as a component of a hypervisor (e.g., a proxy backup client), as a component of a backup system (e.g., a backup server scheduler), and so on. While these backup and/or restore functionalities are not necessarily mutually exclusive (e.g., the presence of one in a virtual environment does not necessarily exclude the proper functioning of another), the implementation of multiple backup and/or restore functionalities in a virtual environment can lead to conflicts, collisions, duplications, and/or other inefficiencies. For example, a backup client does not necessarily interface with a proxy backup client or a backup server scheduler when initiating backups for the virtual machine of the backup client. As a result of this lack of coordination between multiple backup functionalities in a virtual environment, there is an increased risk of conflicts (e.g., two backup requests executed on the same portion of a backup server at a same time), increased risk of duplication (e.g., two different backup functionalities each backing up the same virtual machine information), and/or increased risk of service disruptions (e.g., an urgent restore request delayed while a full backup occurs, degraded functionality at a VM when a backup of the VM is initiated by a backup server at a time when the VM is experiencing a high utilization load, etc.).

Consequently, there is a need for coordination amongst multiple backup and/or restore functionalities in a virtual environment. Aspects of the present disclosure provide this solution in the form of a backup and restore coordinator. The backup and restore coordinator can be configured to interface with a hypervisor hosting numerous virtual machines in a virtual environment having at least two uncoordinated backup functionalities. The backup and restore coordinator can receive backup and restore requests from the at least two uncoordinated backup functionalities and efficiently order the received requests in a queue. The backup and restore coordinator can then cause the backup and restore requests to be implemented in accordance with the order established in the queue.

Aspects of the present disclosure exhibit numerous advantages including, but not limited to, providing coordination amongst multiple backup functionalities implemented in a virtual environment. Coordinating multiple backup functionalities in a virtual environment reduces conflicts and increases efficiency.

Second, aspects of the present disclosure exhibit high usability by prioritizing restore requests over backup requests. Prioritizing restore requests enables prompt regeneration of lost or otherwise corrupted data.

Third, aspects of the present disclosure use monitoring clients to monitor virtual machine backup clients. Monitoring virtual machine backup clients using the monitoring clients enables the backup and restore coordinator to intercept backup and restore requests generated by the backup clients, thereby contributing to reduced conflicts and increased efficiency.

Fourth, aspects of the present disclosure are configurable and customizable. As one example, aspects of the present disclosure account for virtual machine backup preferences when ordering the prioritized queue (e.g., a preferred backup time, a preferred backup frequency, etc.). As another example, aspects of the present disclosure account for administrative preferences when ordering the prioritized queue (e.g., performing auto-registration, defining a type of backup, etc.). Thus, aspects of the present disclosure deliver flexible and customizable solutions depending on the requirements of different virtual environments.

Fifth, aspects of the present disclosure can be provisioned on an as-needed basis in a virtual environment. Thus, the backup and restore coordinator can be created on top of, beside of, or within the hypervisor using the same pool of resources used by the hypervisor.

The non-limiting list of advantages discussed above, and elaborated upon hereafter, are example advantages, and embodiments of the present disclosure can exist that realize all, some, or none of the advantages discussed herein while remaining within the spirit and scope of the present disclosure.

FIG. 1 illustrates a block diagram of an example virtual environment 100 having network resources 102 and hardware resources 104 distributed by a hypervisor 106 to multiple virtual machines (VMs) 108A, 108B, 108C, and 108D (generically referred to as VM 108).

Network resources 102 can include, but are not limited to, external network virtualization (e.g., combining multiple networks, or portions thereof, into a virtual network unit) or internal virtualization (e.g., providing network-like functionality to software containers on a single network server). Network resources 102 can include network hardware (e.g., switches, network adapters, network interface cards (NICs), etc.), network elements (e.g., firewalls, load balancers, etc.), networks (e.g., virtual local area networks), network storage devices, and so on.

Hardware resources 104 includes hardware resources necessary to retrieve, read, compile, execute, process, store, and/or output computer data. Hardware resources 104 can include, for example, disk, storage, memory, and/or other resources that may be necessary to properly implement a VM 108.

Each of the VMs 108 can include a backup client 110A-110D (generically referred to as backup client 110). Backup clients 110 can provide individualized backup functionality to each VM 108. Backup clients 110 can be configured to initiate backups according to a predefined schedule or at times when the respective VM 108 is experiencing relatively low load utilization and can implement a backup process with little or no performance degradation.

Virtual environment 100 further includes a proxy backup client 114 interfacing with the hypervisor 106 and providing backup functionality for all VMs 108 associated with hypervisor 106 according to a predefined schedule.

Virtual environment 100 further includes a backup server 116 interfacing with the hypervisor 106 via the network resources 102. Backup server 116 includes a backup server scheduler 118 configured to backup VMs 108 associated with hypervisor 106 according to the resource utilization of backup server 116 and its associated backup server storage resource 120. Backup server storage resource 120 can be one or more of tape archives, disk storage, and/or other storage that is separated (e.g., geographically separated, virtually isolated, etc.) from VMs 108.

Thus, virtual environment 100 includes three example uncoordinated backup solutions 128 (e.g., backup clients 110 associated with individual VMs 108, proxy backup client 114 associated with hypervisor 106, and backup server scheduler 118 associated with backup server 116). In many virtual environments, at least two of these backup functionalities are present. In such situations, the lack of coordination between multiple backup functionalities can result in conflicts (e.g., multiple simultaneous backup requests), inconsistencies (e.g., separate backups made of the same VM 108 in separate locations), and/or inefficiencies (e.g., backups executed at times inconvenient to the VMs 108 and/or the backup server 116).

As used herein, uncoordinated backup functionalities 128 can refer to backup functionalities that operate without communicating with one another. Uncoordinated backup functionalities 128 can generally be defined as two or more backup and/or restore functionalities that: 1) operate using different technologies and/or different strategies from a same or different vendor (e.g., backup client 110 performs backups using different techniques compared to proxy backup client 114), 2) operate using similar technologies from different vendors (e.g., backup client 110A can be provided from a first vendor and backup client 110B can be provided by a second vendor, causing backup clients 110A and 110B to be uncoordinated), and/or 3) operate without coordination even in situations where the backup functionalities operate using similar technology and are from a same vendor (e.g., backup clients 110A, 110B may be from a same vendor, but are not configured to communicate with one another and are thus uncoordinated).

Advantageously, the present disclosure provides a backup and restore coordinator 122 for coordinating backup and restore requests amongst multiple uncoordinated backup functionalities 128 in virtual environment 100.

Backup and restore coordinator 122 interfaces with the hypervisor 106. Furthermore, backup and restore coordinator 122 establishes monitoring clients 112A-112D (generically referred to as monitoring client 112, and while the arrow shows a connection specifically between backup and restore coordinator 122 and monitoring client 112A, this is representative and not limiting) for each of the VMs 108 associated with hypervisor 106. Monitoring clients 112A-112D can intercept backup request initiated by backup clients 110 and transmit the intercepted backup requests to backup and restore coordinator 122. In some embodiments, monitoring clients 112 collect information from corresponding VMs 108 such as resource utilization to further facilitate efficient backups.

Backup and restore coordinator 122 includes a plurality of backup and restore requests 124. Backup and restore requests 124 can be received via the hypervisor 106 from monitoring clients 112, proxy backup client 114, backup server scheduler 118, and/or any of the VMs 108. In some embodiments, the backup and restore coordinator 122 extracts information from the plurality of backup and restore requests 124 such as, but not limited to, VM 108 information (e.g., target data), backup server information (e.g., storage location), a type of request (e.g., a type of backup or restore request), and a requested time (e.g., start time or finish time).

Backup and restore coordinator 122 further includes queue 126. Queue 126 orders the plurality of backup and restore requests 124 in an order that reduces conflicts, increases efficiency, prioritizes urgent requests over less urgent requests, and/or other considerations that generally improve the performance, functionality, efficiency, and/or usability of the virtual environment 100.

As will be discussed in more detail hereafter, backup and restore coordinator 122 is configured to store information related to the plurality of backup and restore requests 124 in a table with an entry for each VM 108 hosted by hypervisor 106. When an uncoordinated backup functionality 128 requests a backup of a VM 108 (e.g., from backup client 110, proxy backup client 114, and/or backup server scheduler 118), the backup and restore coordinator 122 performs a lookup in the table to determine if another backup is already running. If not, then the backup and restore coordinator 122 can write the start time of the requested backup into the table as the current time and can provide the requesting backup functionality with a token enabling the uncoordinated backup functionality 128 to take a snapshot of the VM 108 to be backed up and initiate the backup process. The uncoordinated backup functionality 128 can communicate a predicted time to finish the backup to the backup and restore coordinator 122, and the backup and restore coordinator 122 can store the predicted finish time in the table in order to properly schedule any future backup requests. If another backup is running, the backup and restore coordinator 122 can delay (e.g., pause, queue, cancel, etc.) the request until the backup is finished and provide a predicted time that the ongoing backup will finish to the requesting backup functionality.

Although backup and restore coordinator 122 is shown alongside hypervisor 106, backup and restore coordinator 122 can be configured to be next to, on top of, or incorporated within hypervisor 106 according to various embodiments.

FIG. 1 is illustrated for ease of discussion and is not to be taken in a limiting sense. Each embodiment of the present disclosure does not necessarily require each component discussed in FIG. 1. Likewise, embodiments of the present disclosure can exist that include more or fewer components than those components illustrated in FIG. 1. Furthermore, the configuration of the components in FIG. 1 is not limiting, and embodiments exist that include similar or dissimilar components arranged in similar or alternative configurations than the configuration shown.

Figure 2:
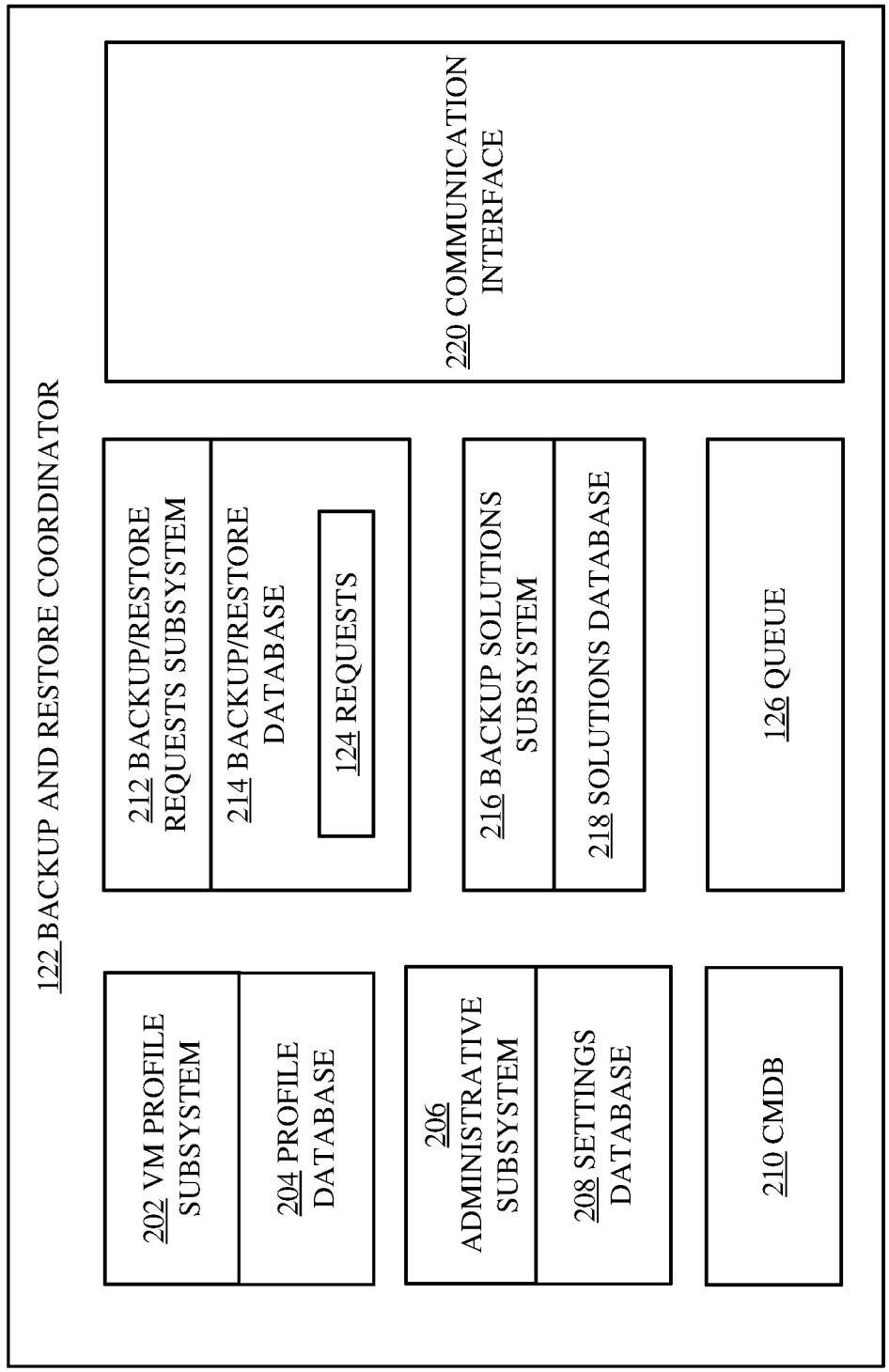
FIG. 2 illustrates a block diagram of an example backup and restore coordinator, in accordance with embodiments of the present disclosure.

Referring now to FIG. 2, illustrated is a block diagram of an example backup and restore coordinator 122, in accordance with embodiments of the present disclosure. Backup and restore coordinator 122 includes a VM profile subsystem 202 that creates a profile for each VM 108 that is managed by the backup and restore coordinator 122. VM profile subsystem 202 manages create, read, update, and delete (CRUD) operations on the VM profiles. Although CRUD operations were previously discussed, other sets of operations such as 1) browse, read, edit, add, delete, or 2) delete, add, view, edit, or 3) create, replicate, append, process also fall within the spirit and scope of the present disclosure. VM profile subsystem 202 includes a VM profile database 204 storing the backup preferences of the VM profiles associated with VM profile subsystem 202. Backup preferences can include, but are not limited to, backup times, backup frequencies, backup types, and/or other preferences.

Backup and restore coordinator 122 further includes an administrative subsystem 206 that manages an administrator-facing interface allowing administrators to connect to the backup and restore coordinator 122 and set preferred settings (e.g., backup frequency, backup times, dynamic backup thresholds, backup types, auto-registration of VMs for backup services, backup prioritization, authorities such as pause, stop, resume, and others that are associated with backups, and so on). Examples of backup frequencies are hourly, daily, weekly, monthly, and so on. Examples of backup times are between 7:00 PM and 5:00 AM, between 11:00 PM and 11:59 PM, and so on. Examples of dynamic backup thresholds are initiating a backup when a VM 108 experiences a resource utilization below 20%, initiating a backup within 24 hours of a VM 108 experiencing a resource utilization above 90%, and so on. Examples of backup types include incremental backups, differential backups, full backups, backups of only files and folders, backups of only full virtual machine disk (VMDK), and so on.

Administrative subsystem 206 is communicatively coupled to a settings database 208 storing the settings configured by administrators interacting with administrative subsystem 206.

Backup and restore coordinator 122 further includes configuration management database (CMDB) 210 for storing information about VMs 108 registered with backup and restore coordinator 122. CMDB 210 can store information including, but not limited to, statuses of various VMs 108 (e.g., development (DEV), production (PROD), etc.), recovery point objectives (RPO) of VMs 108, recovery time objectives (RTO) of VMs 108, and other information that is useful for properly prioritizing backup and/or restore requests of various VMs 108.

Backup and restore coordinator 122 further includes backup and restore requests subsystem 212 for managing all requests to perform backups and/or restores received from VMs 108 or other uncoordinated backup functionalities 128 running in the virtual environment 100 contemporaneously with backup and restore coordinator 122. Backup and restore requests subsystem 212 includes a backup and restore database 214 storing the plurality of backup and restore requests 124 received at the backup and restore coordinator 122. In some embodiments, the backup and restore database 122 stores extracted details from the plurality of backup and restore requests 124 such as, but not limited to, requesting entity (e.g., VM 108, backup client 110, proxy backup client 114, backup server scheduler 118, etc.), target data (e.g., the information to be backed up or restored), backup server details (e.g., ID of the backup server, address of the backup server, type of backup server, etc.), a requested start time, a predicted end time, and so on. In some embodiments, backup and restore database 214 includes at least one instance for each VM 108 hosted by hypervisor 106 in virtual environment 100.

Backup and restore coordinator 122 further includes backup solutions subsystem 216 for registering new backup solutions and new backup servers for each solution (e.g., Tivoli Storage Manager (TSM), Spectrum Protect for Virtual Environments (SP4VE), TSM add-on for databases, Veeam, Veritas NetBackup, etc.). Backup solutions subsystem 216 is further configured to perform CRUD operations on the profiles of the backup solutions. Backup solutions subsystem 216 includes a solutions database 218 storing the backup settings of each backup solution generated by backup solutions subsystem 216.

Backup and restore coordinator 122 further includes queue 126. Queue 126 can order, prioritize, and/or otherwise organize the plurality of backup and restore requests 124 received from two or more uncoordinated backup functionalities 128 in a virtual environment 100. In various embodiments, queue 126 organizes the plurality of backup and restore requests 124 based on one or more of the profile database 204 (e.g., VM 108 preferences), the settings database 208 (e.g., administrator settings), the CMDB 210 (e.g., statuses, RPOs, RTOs, etc.), the backup and restore database 214 (e.g., a listing of historical, ongoing, and pending requests), and/or solutions database 218 (e.g., vendor-specific protocols, preferences, and/or other data).

Backup and restore coordinator 122 further includes a communication interface 220 for managing communication between backup and restore coordinator 122 and a virtual environment 100. Communication interface 220 can, in some embodiments, communicate directly with a hypervisor 106 and/or one or more monitoring clients 112. Communication interface 220 manages authentication functions, security functions, and/or dispatching functions as backup and restore coordinator 122 interacts with other components in a virtual environment 100.

FIG. 2 is illustrated for ease of discussion and is not to be taken in a limiting sense. Each embodiment of the present disclosure does not necessarily require each component discussed in FIG. 2. Likewise, embodiments of the present disclosure can exist that include more or fewer components than those components illustrated in FIG. 2. Furthermore, the configuration of the components in FIG. 2 is not limiting, and embodiments exist that include similar or dissimilar components arranged in similar or alternative configurations than the configuration shown.

Figure 3:
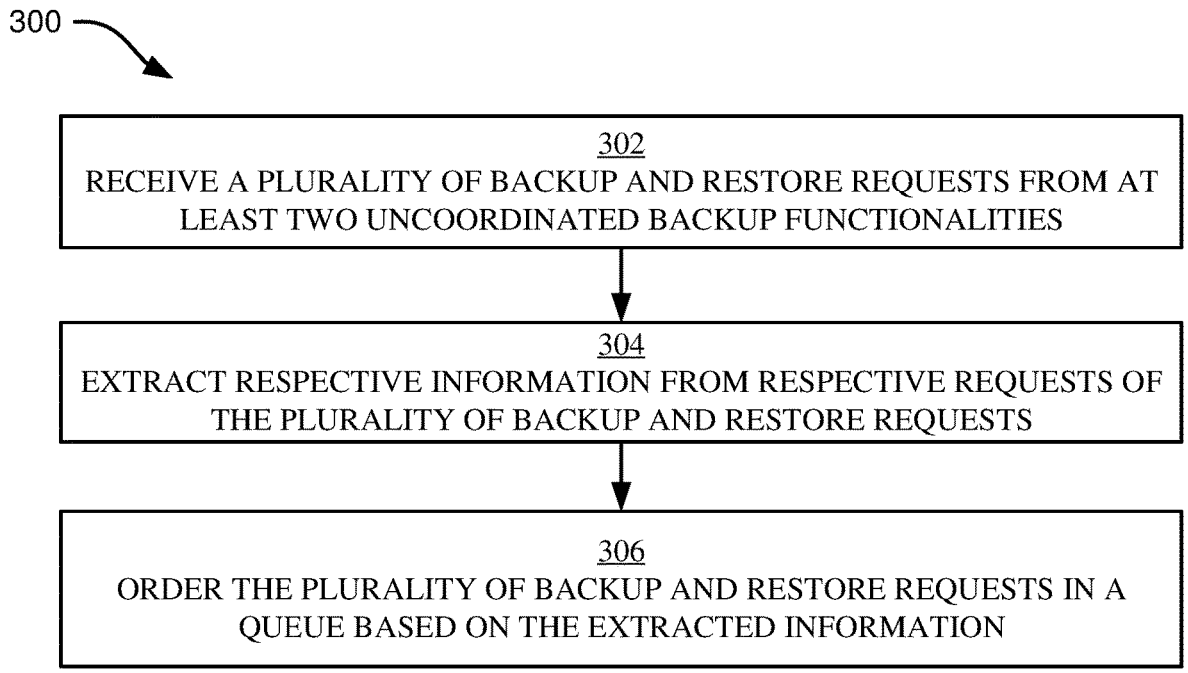
FIG. 3 illustrate a flowchart of an example method for coordinating multiple backup systems by a backup and restore coordinator, in accordance with embodiments of the present disclosure.

Referring now to FIG. 3, illustrated is a flowchart of an example method 300 for managing uncoordinated backup functionalities 128 in a virtual environment 100 using a backup and restore coordinator 122, in accordance with embodiments of the present disclosure. In various embodiments, the method 300 is implemented by a processor executing computer-readable program instructions (e.g., computer system 600 of FIG. 6), by a backup and restore coordinator 122, or by a different configuration of hardware and/or software.

Operation 302 includes receiving, at a backup and restore coordinator 122, a plurality of backup and restore requests 124 from at least two uncoordinated backup functionalities 128 implemented in a virtual environment 100. The virtual environment 100 can include a hypervisor 106 hosting a plurality of virtual machines 108 and a backup server 116 configured to provide redundancy for the plurality of virtual machines 108. In some embodiments, at least a portion of the plurality of backup and restore requests 124 are received from monitoring clients 112.

Operation 304 includes extracting, by the backup and restore coordinator 122 and from respective requests of the plurality of backup and restore requests 124, respective information such as, but not limited to, target data information (e.g., a VM 108 to be backed up or restored), backup server information (e.g., a volume, disk, tape, partition, segment, or other identifying aspect of the backup server being used in the backup or restore request), a type of request (e.g., backup, restore, incremental, differential, full, etc.), a requested start time, and/or a predicted amount of time required to perform the requested operation (or a predicted end time).

Operation 306 includes ordering, by the backup and restore coordinator 122, the plurality of backup and restore requests 124 in a queue 126 of the backup and restore coordinator 122 based on the information extracted from the plurality of backup and restore requests 124. In some embodiments, the queue 126 is further based on information stored in one or more of the profile database 204, the settings database 208, the CMDB 210, the backup and restore database 214, and/or the solutions database 218. The backup and restore coordinator 122 is configured to implement the plurality of backup and restore requests 124 in the virtual environment 100 according to the queue 126. Advantageously, the queue 126 reduces conflicts between at least two uncoordinated backup functionalities 128 and improves the efficiency of backup and restore operations implemented in the virtual environment 100.

In some embodiments, operation 306 includes removing duplicate requests, where the duplicate requests include 1) two or more backup requests attempting to back up a same set of data, and/or 2) two or more restore requests attempting to restore a same set of data. Advantageously, removing duplicate requests increases efficiency by avoiding duplicative processing efforts between multiple uncoordinated backup functionalities 128.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 4:
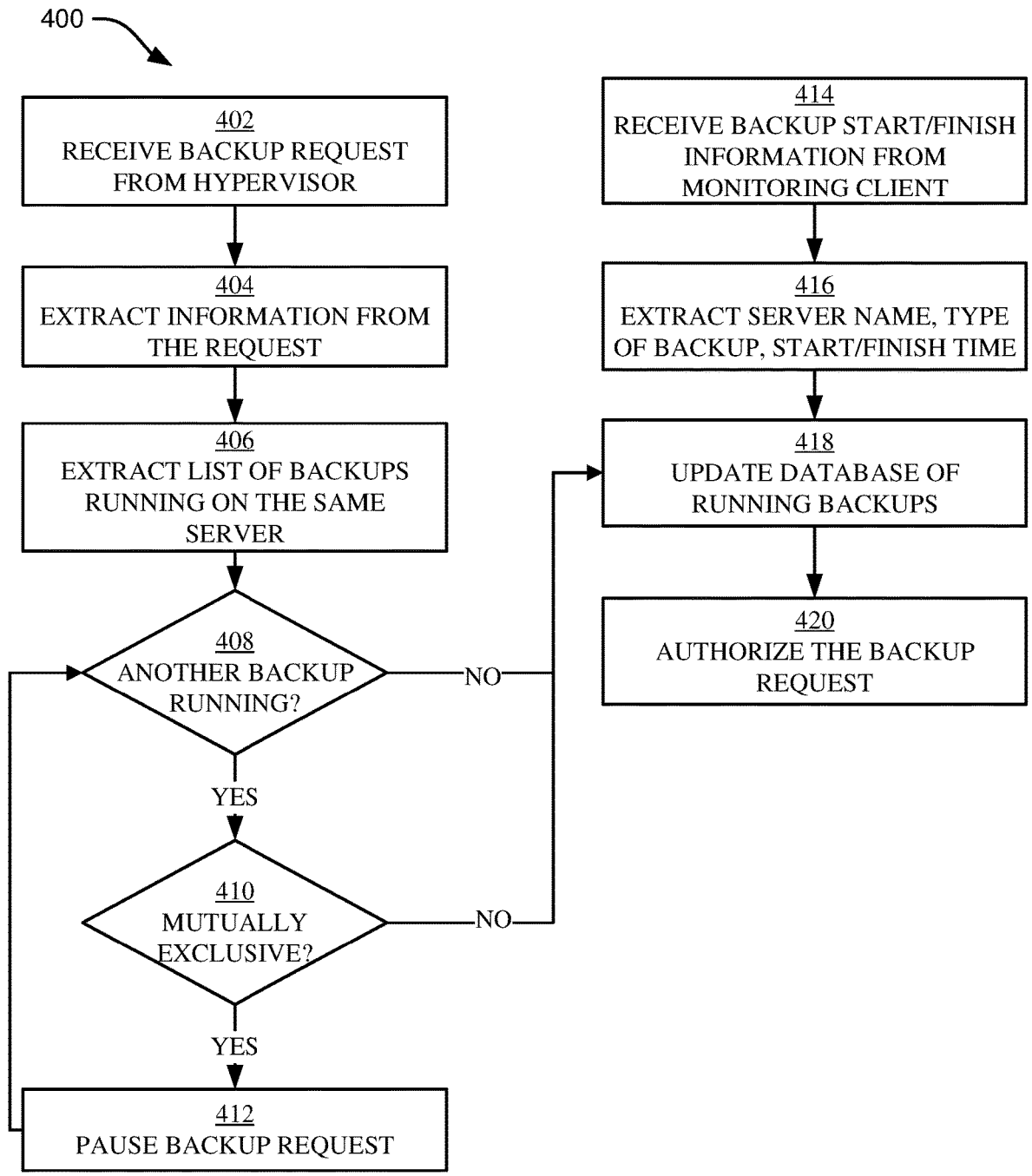
FIG. 4 illustrates a flowchart of an example method for managing backup requests in a virtual environment having multiple backup systems, in accordance with embodiments of the present disclosure.

Referring now to FIG. 4, illustrated is a flowchart of an example method 400 for managing backup requests in a virtual environment 100, in accordance with embodiments of the present disclosure. In various embodiments, the method 400 is implemented by a processor executing computer-readable program instructions (e.g., computer system 600 of FIG. 6), by a backup and restore coordinator 122, or by a different configuration of hardware and/or software.

Operation 402 includes receiving, by a backup and restore coordinator 122, a backup request from a hypervisor 106. The backup request can be initiated by, for example, a proxy backup client 114, a backup server scheduler 118, a VM 108, or a different entity.

Operation 404 includes extracting, by the backup and restore coordinator 122, information from the received request. The information can include, but is not limited to, an identification of the target data to be backed up, an identification of a server or other storage unit that will store the target data, a type of backup, a starting time, and/or a predicted duration (or predicted end time).

Operation 406 includes extracting, by the backup and restore coordinator 122, a list of backups and/or restores running on the same storage location as included in the request. The list of backups can be retrieved by, for example, querying the backup and restore database 214.

Operation 408 includes determining, by the backup and restore coordinator 122, if another backup is currently running based on the list of backups extracted in operation 406. In the event that there is no other backup currently running on the backup server (e.g., NO at operation 408), the method 400 proceeds to operation 418 and updates the backup and restore database 214 to indicate the backup request received in operation 402 is now a running backup.

The method 400 then proceeds to operation 420 and authorizes the backup request. The backup request can be authorized by providing a token to the requesting backup functionality that enables the requesting backup functionality to take a snapshot of the target data (e.g., VM 108) that it is backing up and start the backup process.

Returning again to operation 408, in the event the backup and restore coordinator 122 determines that another backup is running (e.g., YES at operation 408), then the backup and restore coordinator 122 continues to operation 410 and determines if the backup requested in operation 402 and the backup currently running are mutually exclusive (e.g., mutually exclusive can mean that both backup operations are writing to the same backup server, disk, tape, or storage partition, or that both backup operations are backing up at least some of the same data).

If the running backup operation and the requested backup operation are not mutually exclusive (e.g., NO at operation 410, in other words the running backup operation and the requested backup operation are directed to non-overlapping backup resources), then the backup and restore coordinator 122 proceeds to operation 418 and updates the backup and restore database 214 and then continues to operation 420 and authorizes the backup request.

Returning again to operation 410, if the running backup operation and the requested backup operation are mutually exclusive (e.g., YES at operation 410), then the backup and restore coordinator 122 proceeds to operation 412 and pauses (e.g., delays) the requested backup. Pausing the requested backup can include, for example, placing the backup request in a queue 126 of pending requests, pausing for a predetermined amount of time and then returning to operation 408, canceling the request in order to force the backup to be re-requested at a later time, or a different technique configured to delay the execution of the requested backup. In some embodiments, the requested backup is paused until the backup and restore coordinator 122 receives an indication that the other backup is completed.

Referring now to operation 414, operation 414 indicates a second entrance point for aspects of the method 400. Operation 414 includes receiving, at the backup and restore coordinator 122, backup start and finish information from a monitoring client 112 interfacing with a backup client 110 on a VM 108 associated with the hypervisor 106. The monitoring client 112 can identify a backup based on monitoring the backup client 110, monitoring server logs, monitoring backup logs, or other techniques. The monitoring client 112 can transmit such information to backup and restore coordinator 122 as shown in operation 414.

Operation 416 includes extracting, by the backup and restore coordinator 122, information from the request received in operation 414. Operation 416 can be consistent with operation 404.

Operation 418 includes updating the backup and restore database 214 with the information extracted in operation 416. The backup and restore coordinator 122 then authorizes the backup request in operation 420.

As can be seen, in some embodiments, backups initiated by backup clients 110 on VMs 108 may not be able to be stopped, and thus, the backup and restore coordinator 122 automatically authorizes the backup and records the backup information in the backup and restore database 214 as shown in operations 414-420.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 5:
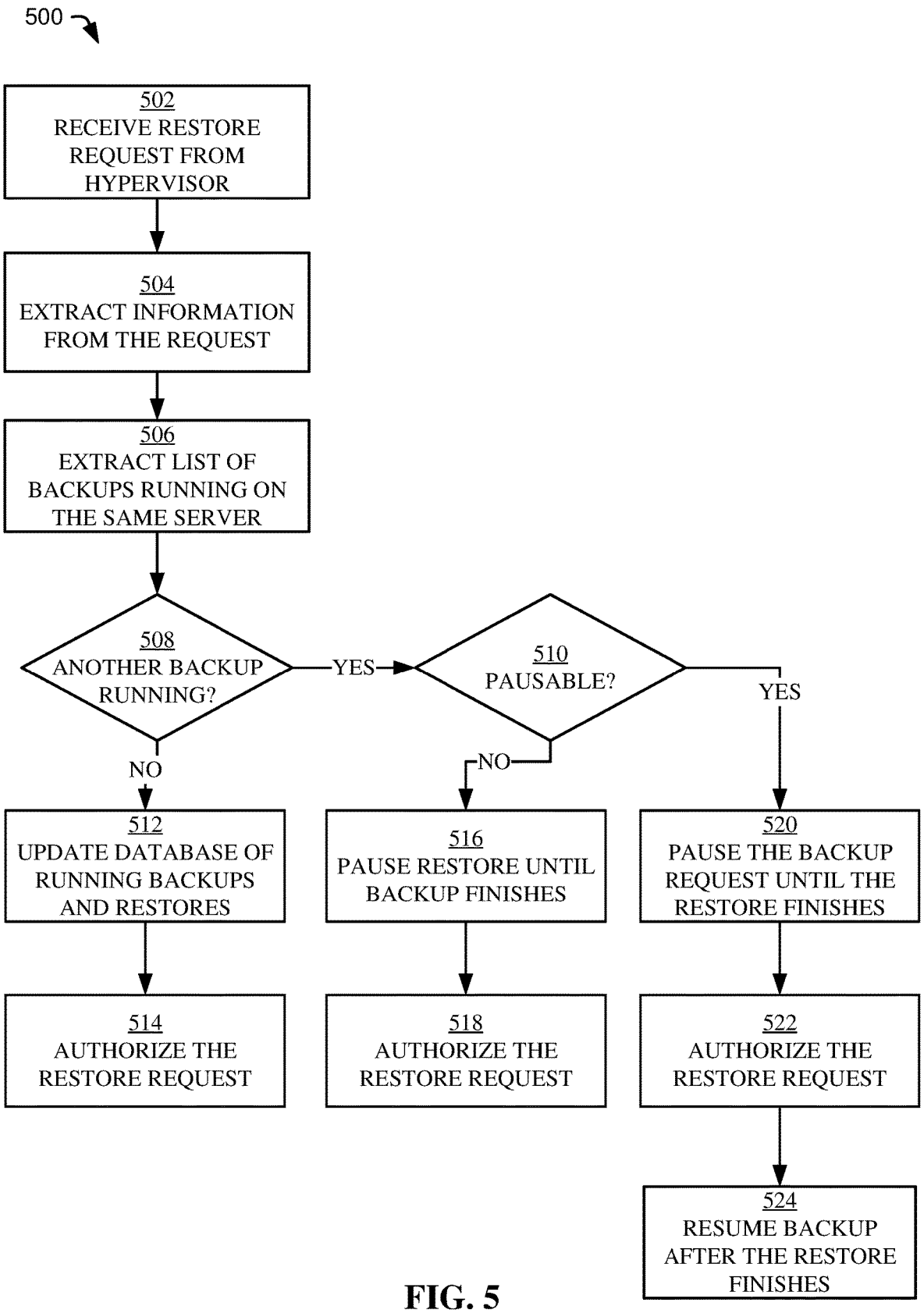
FIG. 5 illustrates a flowchart of an example method for managing restore requests in a virtual environment having multiple backup systems, in accordance with embodiments of the present disclosure.

Referring now to FIG. 5, illustrated is a flowchart of an example method 500 for resolving conflicts between backup requests and restore requests using a backup and restore coordinator 122, in accordance with embodiments of the present disclosure. In various embodiments, the method 500 is implemented by a processor executing computer-readable program instructions (e.g., computer system 600 of FIG. 6), by a backup and restore coordinator 122, or by a different configuration of hardware and/or software.

Operation 502 includes receiving, at the backup and restore coordinator 122, a restore request from a hypervisor 106. The restore request can be initiated by a VM 108, a proxy backup client 114, a backup client 110, a monitoring client 112, a backup server 116, or a different entity.

Operation 504 includes extracting, by the backup and restore coordinator 122, information about the requested restore. The information can include, for example, a location of the data to be restored (e.g., a server name, location, and/or address), a type of restore, a starting time of the restore, and predicted duration of the restore, an urgency of the restore, and/or other information.

Operation 506 includes extracting, by the backup and restore coordinator 122, a list of backups running on the server related to the restore request. The list of backups running on the server can be retrieved from the backup and restore database 214.

Operation 508 includes determining, by the backup and restore coordinator 122, if another backup is currently running based on the list of backups retrieved in operation 506. In the event no other backups are running (e.g., NO at operation 508), the backup and restore coordinator 122 proceeds to operation 512 and updates the backup and restore database 214 with information regarding the requested restore. The backup and restore coordinator 122 then proceeds to operation 514 and authorizes the restore request. In some embodiments, authorizing the restore request includes providing a token to the requesting entity so that the requesting entity can initiate the restore process.

Returning again to operation 508, in the event there is another backup running (e.g., YES at operation 508), the backup and restore coordinator 122 proceeds to operation 510 and determines if the backup is pausable (e.g., if the backup can or cannot be paused). Various backups can be paused without compromising data integrity, client performance, or contractual obligations, whereas other backups should not be paused in order to avoid data corruptions, service interruptions, contractual breaches, or other negative consequences. Various factors can indicate if a backup is pausable including settings configured in, for example, profile database 204, settings database 206, CMDB 210, backup and restore database 214, and/or solutions database 218.

In the event that the currently running backup is not pausable (e.g., NO at operation 510), the backup and restore coordinator 122 proceeds to operation 516 and pauses the requested restore until the backup finishes. Once the ongoing backup finishes, the method 500 proceeds to operation 518 and authorizes the restore request. In some embodiments, the restore is paused until a predicted end time of the backup, where the predicted end time is retrieved from backup and restore database 214. In other embodiments, the restore is paused for a predetermined amount of time.

Returning again to operation 510, in the event that the ongoing backup process is pausable (e.g., YES at operation 510), then the backup and restore coordinator 122 proceeds to operation 520 and pauses the backup request and authorizes the restore request in operation 522. Once the restore operation is completed, the backup and restore coordinator 122 proceeds to operation 524 and resumes the backup operation paused in operation 520 and upon completion of the restore authorized in operation 522. Advantageously, operations 520-524 improve functionality in a virtual environment 100 by prioritizing restore requests over backup requests even when the backup requests have already been initiated, and even when the received restore request and the ongoing backup are initiated by different uncoordinated backup functionalities 128.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 6:
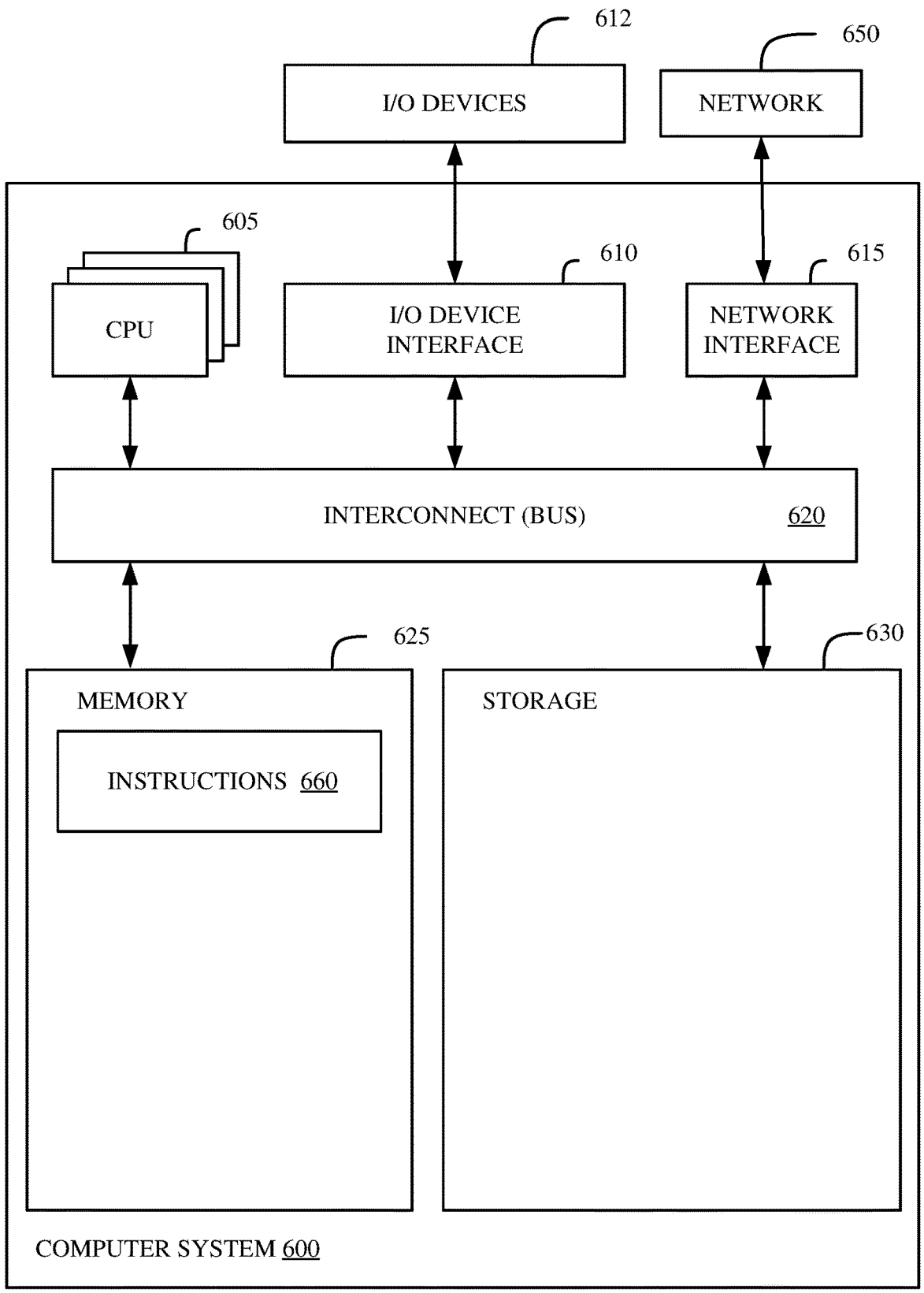
FIG. 6 illustrates a block diagram of an example computer system, in accordance with embodiments of the present disclosure.

FIG. 6 illustrates a block diagram of an example computer system 600 in accordance with some embodiments of the present disclosure. In some embodiments, computer system 600 illustrates hardware functionality that may be physically or virtually utilized by backup and restore coordinator 122. In various embodiments, computer system 600 can perform the methods described in FIGS. 3-5 and/or the functionality discussed in FIGS. 1 and 2. In some embodiments, computer system 600 provides instructions for the aforementioned methods and/or functionalities to a client machine such that the client machine executes the method, or a portion of the method, based on the instructions provided by the computer system 600. In some embodiments, computer system 600 comprises software executing on hardware incorporated into a plurality of devices.

The computer system 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, or flash memory devices. In an alternative embodiment, the storage 630 can be replaced by storage area-network (SAN) devices, the cloud, or other devices connected to the computer system 600 via the I/O device interface 610 or a network 650 via the network interface 615.

In some embodiments, the memory 625 stores instructions 660. However, in various embodiments, the instructions 660 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods of FIGS. 3-5 and/or any of the functionality discussed in FIGS. 1 and 2.

In various embodiments, the I/O devices 612 include an interface capable of presenting information and receiving input. For example, I/O devices 612 can present information to a user interacting with computer system 600 and receive input from the user.

Computer system 600 is connected to the network 650 via the network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
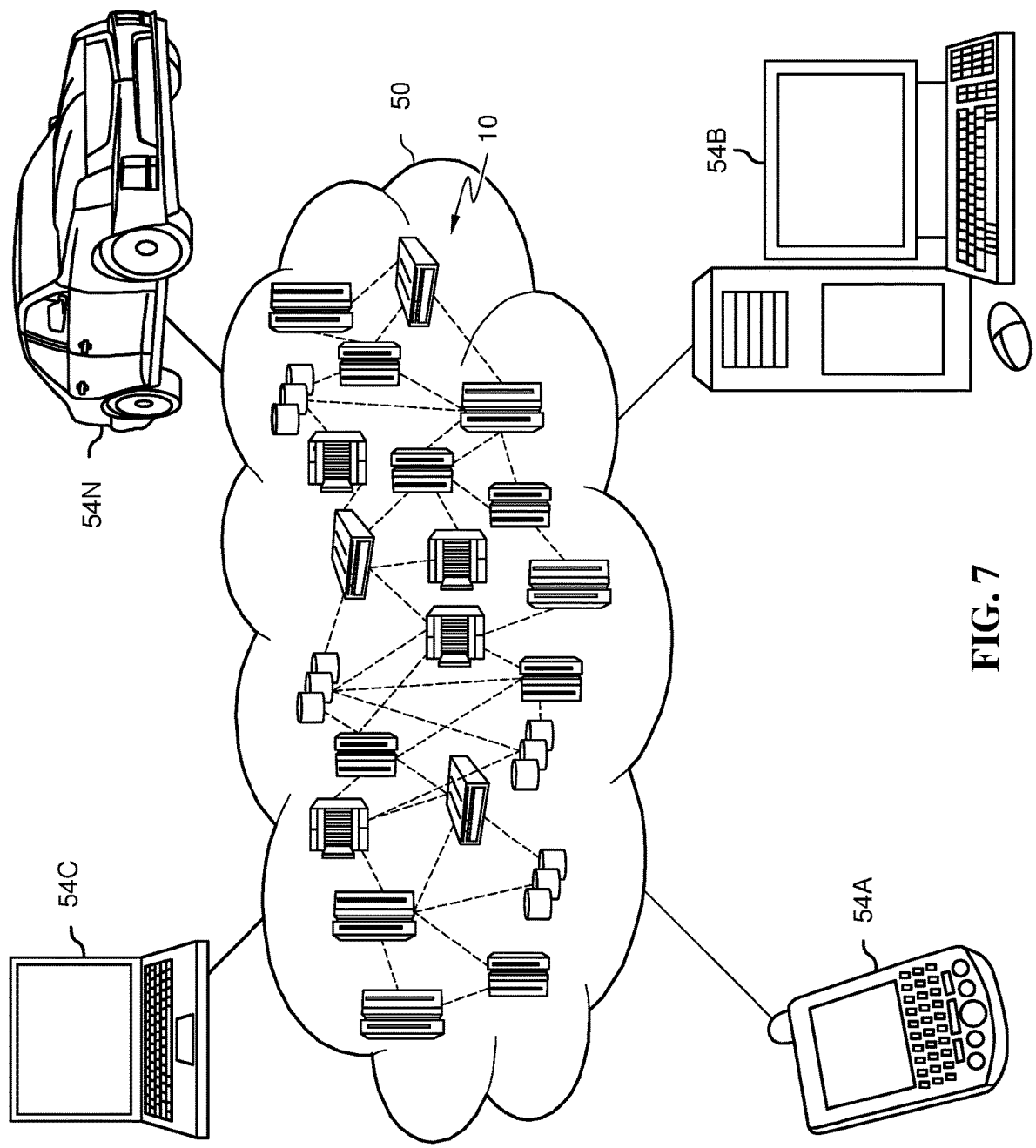
FIG. 7 depicts a cloud computing environment, according to some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
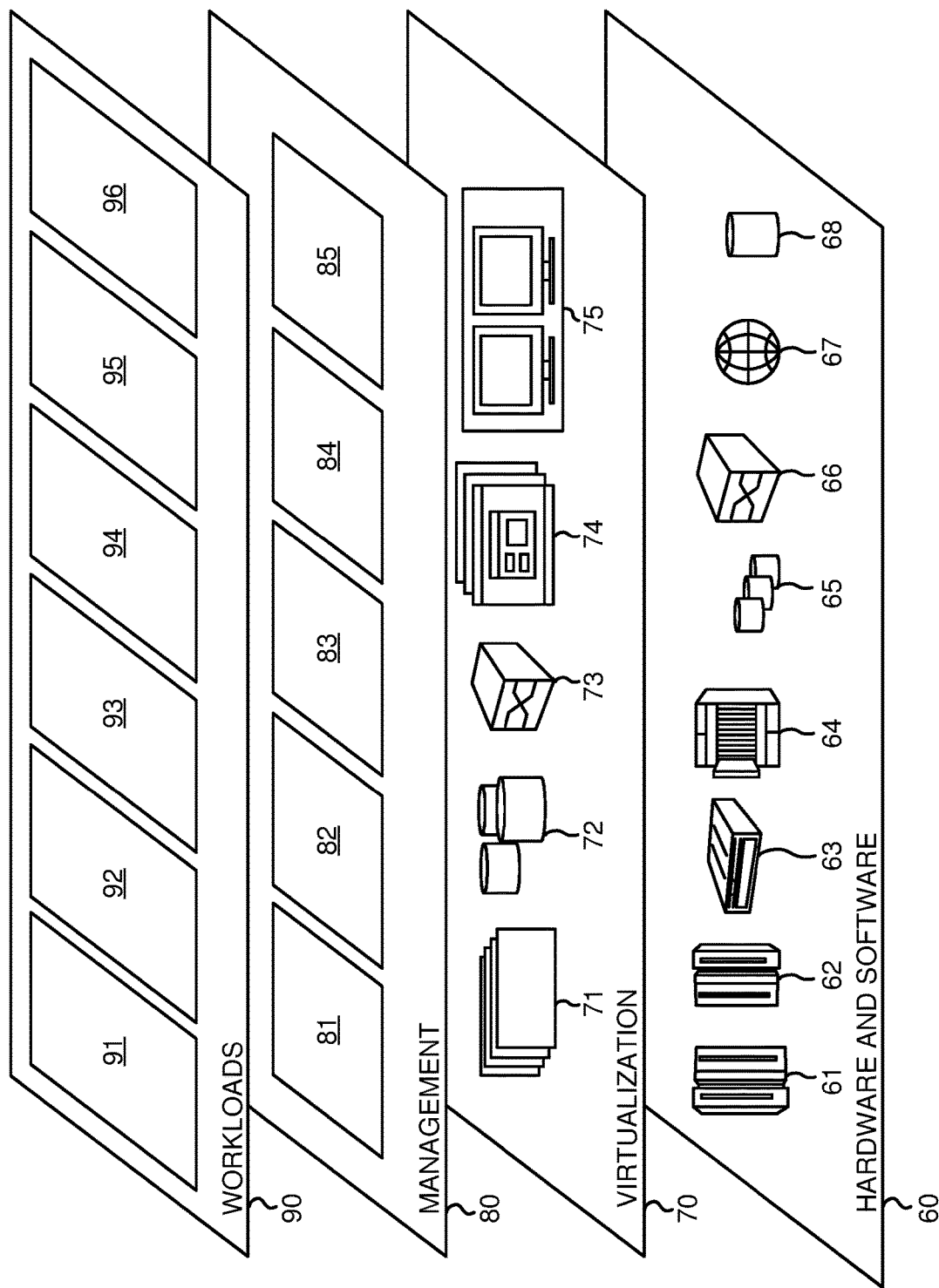
FIG. 8 depicts abstraction model layers, according to some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and backup and restore coordination 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 3-5 and/or any of the functionality discussed in FIGS. 1 and 2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

In order to further clarify aspects of the present disclosure, a non-exhaustive, non-limiting list of example embodiments will be discussed.

In a first example embodiment, aspects of the present disclosure are directed toward a method comprising receiving, at a backup and restore coordinator, a plurality of backup and restore requests from at least two uncoordinated backup functionalities implemented in a virtual environment, the virtual environment including a hypervisor hosting a plurality of virtual machines and a backup server. The method further comprising extracting, by the backup and restore coordinator and from respective requests of the plurality of backup and restore requests, respective information including target data, backup resource information, and a type of request. The method further comprising ordering the plurality of backup and restore requests in a prioritized queue of the backup and restore coordinator based on the information extracted from the plurality of backup and restore requests.

In a second example embodiment including the aspects of the first embodiment, a first request of the plurality of backup and restore requests is prioritized over a second request in response to determining that the first request is a restore request and that the second request is a backup request.

In a third example embodiment including the aspects of any of the first embodiment, a first request of the plurality of backup and restore requests is executed simultaneously with a second request in response to determining that the first request and the second request are associated with non-overlapping backup resources.

In a fourth example embodiment including the aspects of any of the first through third embodiments, at least a portion of the plurality of backup and restore requests are received at the backup and restore coordinator from a monitoring client implemented by the backup and restore coordinator, and where the monitoring client is associated with a backup client of a virtual machine of the plurality of virtual machines.

In a fifth example embodiment including the aspects of any of the first through fourth embodiments, the ordering the plurality of backup and restore requests in the prioritized queue is based at least in part on backup preferences for respective virtual machines of the plurality of virtual machines hosted by the hypervisor, where the backup preferences comprise preferred times and preferred frequencies.

In a sixth example embodiment including the aspects of any of the first through fifth embodiments, the ordering the plurality of backup and restore requests in the prioritized queue is based at least in part on a backup and restore database storing information related to ongoing and historical backups and restores associated with the plurality of virtual machines.

In a seventh example embodiment including the aspects of any of the first through sixth embodiments, the ordering the plurality of backup and restore requests in the prioritized queue is based at least in part on settings configured by an administrator of the backup and restore coordinator, where the settings include at least a type of backup, an auto-registration configuration, and an ordering scheme.

In an eighth example embodiment including the aspects of any of the first through seventh embodiments, the at least two uncoordinated backup functionalities are provided by different vendors.

In a ninth example embodiment including the aspects of any of the first through eighth embodiments, the at least two uncoordinated backup functionalities comprise a backup client implemented by one of the plurality of virtual machines, and another uncoordinated backup functionality selected from a group consisting of: a proxy backup client associated with the hypervisor, and a backup server scheduler associated with the backup server.

In a tenth example embodiment including the aspects of any of the first through eighth embodiments, the at least two uncoordinated backup functionalities comprise a backup client implemented by one of the plurality of virtual machines, a proxy backup client associated with the hypervisor, and a backup server scheduler associated with the backup server.

In an eleventh example embodiment including the aspects of any of the first through tenth embodiments, the ordering the plurality of backup and restore requests includes removing duplicate requests, wherein duplicate requests include at least two backup requests received from different uncoordinated backup functionalities and attempting to backup a same set of data.

In a twelfth example embodiment including the aspects of any of the first through eleventh embodiments, the ordering the plurality of backup and restore requests includes removing duplicate requests, wherein duplicate requests include at least two restore requests received from different uncoordinated backup functionalities and attempting to restore a same set of data.

In a thirteenth example embodiment including the aspects of any of the first through eleventh embodiments, the plurality of backup and restore requests includes a first backup request, and ordering the plurality of backup and restore requests further comprises determining, by the backup and restore coordinator querying a backup and restore database, that no other backups are currently running, and updating, by the backup and restore coordinator, the backup and restore database to include the first backup request, and authorizing, by the backup and restore coordinator, the first backup request in response to determining that no other backups are currently running.

In a fourteenth example embodiment including the aspects of any of the first through eleventh embodiments, the plurality of backup and restore requests includes a first backup request, and where ordering the plurality of backup and restore requests further comprises determining, by the backup and restore coordinator querying a backup and restore database, that another backup is running on a different backup resource than a backup resource included in the first backup request, and updating, by the backup and restore coordinator, the backup and restore database to include the first backup request, and authorizing, by the backup and restore coordinator, the first backup request in response to determining that the other backup is running on the different backup resource, wherein the first backup request and the other backup execute simultaneously.

In a fifteenth example embodiment including the aspects of any of the first through eleventh embodiments, the plurality of backup and restore requests includes a first backup request, and where ordering the plurality of backup and restore requests further comprises determining, by the backup and restore coordinator querying a backup and restore database, that another backup is running on a same backup resource as a backup resource included in the first backup request; and delaying, by the backup and restore coordinator, the first backup request; and authorizing, by the backup and restore coordinator, the first backup request in response to receiving an indication that the other backup is finished.

In a sixteenth example embodiment including the aspects of any of the fifteenth embodiment, the first backup request is delayed until a predicted end time of the other backup, wherein the predicted end time is retrieved from the backup and restore database.

In a seventeenth example embodiment including the aspects of any of the first through eleventh embodiments, the plurality of backup and restore requests includes a first restore request, and where ordering the plurality of backup and restore requests further comprises determining, by the backup and restore coordinator querying a backup and restore database, that another backup is currently running; and determining, by the backup and restore coordinator, that the other backup cannot be paused; and delaying, by the backup and restore coordinator, the first restore request until the other backup is complete; and authorizing, by the backup and restore coordinator, the first restore request in response to an indication that the other backup completed.

In an eighteenth example embodiment including the aspects of any of the first through eleventh embodiments, where the plurality of backup and restore requests includes a first restore request, and where ordering the plurality of backup and restore requests further comprises determining, by the backup and restore coordinator querying a backup and restore database, that another backup is currently running; and pausing, by the backup and restore coordinator, the other backup; and authorizing, by the backup and restore coordinator, the first restore request; and resuming, by the backup and restore coordinator, the other backup upon completion of the first restore request.

In a nineteenth example embodiment, aspects of the present disclosure are directed toward a computer program product configured to perform functionality previously discussed in any of the first through eighteenth example embodiments.

In a twentieth example embodiment, aspects of the present disclosure are directed to a system storing processor-executable instructions in a tangible storage medium, which, when executed by a processor, are configured to perform methods consistent with any of the first through eighteenth example embodiments previously discussed.

In a twenty-first example embodiment, aspects of the present disclosure are directed to a system comprising a hypervisor; a plurality of virtual machines (VMs) hosted by the hypervisor; a backup server communicatively coupled to the hypervisor; at least two uncoordinated backup functionalities configured to provide redundancy to the plurality of virtual machines using the backup server; and a backup and restore coordinator communicatively coupled to the hypervisor, wherein the backup and restore coordinator comprises a prioritized queue that orders a plurality of backup and restore requests received from the at least two uncoordinated backup functionalities.

In a twenty-second example embodiment, aspects of the present disclosure are directed to a backup and restore coordinator comprising a communication interface for communicating with a hypervisor and a plurality of monitoring clients respectively coupled to a plurality of virtual machines hosted by the hypervisor in a virtual environment. The backup and restore coordinator further comprising a profiles database storing backup preferences of the plurality of virtual machines. The backup and restore coordinator further comprising a settings database storing administrative settings regarding types of backups for respective virtual machines, auto-registration settings for respective virtual machines, and a prioritization scheme. The backup and restore coordinator further comprising a backup and restore database storing historical and ongoing requests for backups and restores received from at least two uncoordinated backup functionalities implemented in the virtual environment. The backup and restore coordinator further comprising a prioritized queue of backups and restores for the plurality of virtual machines, wherein the prioritized queue orders a plurality of backup and restore requests based on information in the profiles database, settings database, and backup and restore database. The backup and restore coordinator further configured to implement backups and restores in the virtual environment according to the prioritized queue.

The aforementioned list of first through twenty-second example embodiments is non-limiting and non-exhaustive.

What is claimed is:

1. A method comprising:
   receiving, at a backup and restore coordinator, a plurality of backup and restore requests from at least two uncoordinated backup functionalities implemented in a virtual environment, the virtual environment including a hypervisor hosting a plurality of virtual machines and a backup server, wherein the at least two uncoordinated backup functionalities do not communicate with one another, and wherein the at least two uncoordinated backup functionalities comprise (a) backup clients associated to respective ones of the virtual machines; and (b) a proxy backup client associated to the hypervisor;
   extracting, by the backup and restore coordinator and from respective requests of the plurality of backup and restore requests, respective information including target data, backup resource information, and a type of request; and
   coordinating the plurality of backup and restore requests, based on the information extracted from the plurality of backup and restore requests, to avoid one or more of the following selected from the group consisting of (i) multiple backups being performed simultaneously, (ii) the same virtual machine being backed up in separate locations, wherein the coordinating includes ordering the plurality of backup and restore requests in a prioritized queue of the backup and restore coordinator based on the information extracted from the plurality of backup and restore requests.

2. The method of claim 1, wherein a first request of the plurality of backup and restore requests is prioritized over a second request in response to determining that the first request is a restore request and that the second request is a backup request.

3. The method of claim 1, wherein a first request of the plurality of backup and restore requests is executed simultaneously with a second request in response to determining that the first request and the second request are associated with non-overlapping backup resources.

4. The method of claim 1, wherein at least a portion of the plurality of backup and restore requests are received at the backup and restore coordinator from a monitoring client implemented by the backup and restore coordinator, and wherein the monitoring client is associated with a backup client of a virtual machine of the plurality of virtual machines.

5. The method of claim 1, wherein ordering the plurality of backup and restore requests in the prioritized queue is based at least in part on backup preferences for respective virtual machines of the plurality of virtual machines hosted by the hypervisor, wherein the backup preferences comprise preferred back up times and preferred back up frequencies.

6. The method of claim 1, wherein ordering the plurality of backup and restore requests in the prioritized queue is based at least in part on a backup and restore database storing information related to ongoing and historical backups and restores associated with the plurality of virtual machines.

7. The method of claim 1, wherein ordering the plurality of backup and restore requests in the prioritized queue is based at least in part on settings configured by an administrator of the backup and restore coordinator, wherein the settings include at least a type of backup, an auto-registration configuration, and an ordering scheme.

8. The method of claim 1, wherein the at least two uncoordinated backup functionalities are provided by different vendors.

9. The method of claim 1, wherein the at least two uncoordinated backup functionalities comprise a plurality of backup clients respectively implemented by each of the plurality of virtual machines, and another uncoordinated backup functionality selected from a group consisting of: a proxy backup client implemented by the hypervisor, and a backup server scheduler implemented by the backup server.

10. The method of claim 1, wherein the at least two uncoordinated backup functionalities comprise a plurality of backup clients, a proxy backup client implemented by the hypervisor, and a backup server scheduler implemented by the backup server, wherein each of the plurality of backup clients is embedded within one of the plurality of virtual machines.

11. The method of claim 1, wherein ordering the plurality of backup and restore requests includes removing duplicate requests, wherein duplicate requests include at least two backup requests received from different uncoordinated backup functionalities and attempting to back up a same set of data.

12. The method of claim 1, wherein ordering the plurality of backup and restore requests includes removing duplicate requests, wherein duplicate requests include at least two restore requests received from different uncoordinated backup functionalities and attempting to restore a same set of data.

13. The method of claim 1, wherein the plurality of backup and restore requests includes a first backup request, and wherein ordering the plurality of backup and restore requests further comprises:
   determining, by the backup and restore coordinator querying a backup and restore database, that no other backups are currently running;
   updating, by the backup and restore coordinator, the backup and restore database to include the first backup request; and
   authorizing, by the backup and restore coordinator, the first backup request in response to determining that no other backups are currently running.

14. The method of claim 1, wherein the plurality of backup and restore requests includes a first backup request, and wherein ordering the plurality of backup and restore requests further comprises:
   determining, by the backup and restore coordinator querying a backup and restore database, that another backup is running on a different backup resource than a backup resource included in the first backup request;
   updating, by the backup and restore coordinator, the backup and restore database to include the first backup request; and
   authorizing, by the backup and restore coordinator, the first backup request in response to determining that the other backup is running on the different backup resource, wherein the first backup request and the other backup execute simultaneously.

15. The method of claim 1, wherein the plurality of backup and restore requests includes a first backup request, and wherein ordering the plurality of backup and restore requests further comprises:
   determining, by the backup and restore coordinator querying a backup and restore database, that another backup is running on a same backup resource as a backup resource included in the first backup request;
   delaying, by the backup and restore coordinator, the first backup request; and
   authorizing, by the backup and restore coordinator, the first backup request in response to receiving an indication that the other backup is finished.

16. The method of claim 15, wherein the first backup request is delayed until a predicted end time of the other backup, wherein the predicted end time is retrieved from the backup and restore database.

17. The method of claim 1, wherein the plurality of backup and restore requests includes a first restore request, and wherein ordering the plurality of backup and restore requests further comprises:
   determining, by the backup and restore coordinator querying a backup and restore database, that another backup is currently running;
   determining, by the backup and restore coordinator, that the other backup cannot be paused;
   delaying, by the backup and restore coordinator, the first restore request until the other backup is complete; and
   authorizing, by the backup and restore coordinator, the first restore request in response to an indication that the other backup completed.

18. The method of claim 1, wherein the plurality of backup and restore requests includes a first restore request, and wherein ordering the plurality of backup and restore requests further comprises:
   determining, by the backup and restore coordinator querying a backup and restore database, that another backup is currently running;
   pausing, by the backup and restore coordinator, the other backup;
   authorizing, by the backup and restore coordinator, the first restore request; and
   resuming, by the backup and restore coordinator, the other backup upon completion of the first restore request.

19. A system comprising:
   a hypervisor;
   a plurality of virtual machines (VMs) hosted by the hypervisor;
   a backup server communicatively coupled to the hypervisor;
   at least two different types of uncoordinated backup functionality configured to provide redundancy to the plurality of virtual machines using the backup server, wherein the at least two uncoordinated backup functionalities do not communicate with one another, and wherein the at least two uncoordinated backup functionalities comprise (a) backup clients associated to respective ones of the virtual machines; and (b) a proxy backup client associated to the hypervisor; and
   a backup and restore coordinator communicatively coupled to the hypervisor, that coordinates a plurality of backup and restore requests based on information extracted from the plurality of backup and restore requests, to avoid one or more of the following selected from the group consisting of (i) multiple backups being performed simultaneously, (ii) the same virtual machine being backed up in separate locations, wherein the backup and restore coordinator comprises a prioritized queue that orders a plurality of backup and restore requests received from the at least two different types of uncoordinated backup functionality.

20. A backup and restore coordinator comprising:
   a communication interface for communicating with a hypervisor and a plurality of monitoring clients respectively coupled to a plurality of virtual machines hosted by the hypervisor in a virtual environment;
   a profiles database storing backup preferences of the plurality of virtual machines;
   a settings database storing administrative settings regarding types of backups for respective virtual machines, auto-registration settings for respective virtual machines, and a prioritization scheme;
   a backup and restore database storing requests for backups and restores received from a plurality of uncoordinated backup functionalities including a plurality of backup clients respectively implemented by each of the plurality of virtual machines, a proxy backup client implemented by the hypervisor, and a backup server scheduler implemented by a backup server, wherein the plurality of uncoordinated backup functionalities do not communicate with one another, and wherein the plurality of uncoordinated backup functionalities comprise (a) backup clients associated to respective ones of the virtual machines; and (b) a proxy backup client associated to the hypervisor;
   a prioritized queue of backups and restores for the plurality of virtual machines, wherein the prioritized queue orders a plurality of backup and restore requests based on information in the profiles database, settings database, and backup and restore database;
   wherein the backup and restore coordinator is configured for coordinating the plurality of backup and restore requests, based on information extracted from the plurality of backup and restore requests, to avoid one or more of the following selected from the group consisting of (i) multiple backups being performed simultaneously, (ii) the same virtual machine being backed up in separate locations; and
   wherein the backup and restore coordinator is configured to implement backups and restores in the virtual environment according to the prioritized queue.

* * * * *